(12) United States Patent
Goda et al.

(10) Patent No.: US 12,026,867 B2
(45) Date of Patent: Jul. 2, 2024

(54) APPARATUS FOR ANALYZING COMPOSITION OF ELECTRONIC AND ELECTRICAL DEVICE PART SCRAPS, DEVICE FOR PROCESSING ELECTRONIC AND ELECTRICAL DEVICE PART SCRAPS, AND METHOD FOR PROCESSING ELECTRONIC AND ELECTRICAL DEVICE PART SCRAPS

(71) Applicant: JX METALS CORPORATION, Tokyo (JP)

(72) Inventors: Tomonari Goda, Hitachi (JP); Toshifumi Kawamura, Hitachi (JP)

(73) Assignee: JX METALS CORPORATION, Tokyo (JP)

( * ) Notice: Subject to any disclaimer, the term of this patent is extended or adjusted under 35 U.S.C. 154(b) by 278 days.

(21) Appl. No.: 17/290,167

(22) PCT Filed: Oct. 30, 2019

(86) PCT No.: PCT/JP2019/042696
§ 371 (c)(1),
(2) Date: Apr. 29, 2021

(87) PCT Pub. No.: WO2020/090941
PCT Pub. Date: May 7, 2020

(65) Prior Publication Data
US 2022/0005171 A1 Jan. 6, 2022

(30) Foreign Application Priority Data
Oct. 31, 2018 (JP) .................. 2018-206160

(51) Int. Cl.
*G06T 7/00* (2017.01)
*G06T 7/62* (2017.01)

(52) U.S. Cl.
CPC ............ *G06T 7/001* (2013.01); *G06T 7/62* (2017.01); *G06T 2207/20081* (2013.01); *G06T 2207/30136* (2013.01); *G06T 2207/30148* (2013.01)

(58) Field of Classification Search
CPC . G06T 7/001; G06T 7/62; G06T 2207/20081; G06T 2207/30136;
(Continued)

(56) References Cited

FOREIGN PATENT DOCUMENTS

| JP | 6-226239 A | 8/1994 |
|---|---|---|
| JP | 9-78151 A | 3/1997 |

(Continued)

OTHER PUBLICATIONS

International Search Report for PCT/JP2019/042696 (PCT/ISA/210) mailed on Jan. 7, 2020.
(Continued)

*Primary Examiner* — Samir A Ahmed
(74) *Attorney, Agent, or Firm* — Birch, Stewart, Kolasch & Birch, LLP (57) ABSTRACT

Provided is an apparatus for analyzing composition of electronic and electrical device part scraps which can determine a composition of part scraps in the electronic and electrical device part scraps in a short time, a device for processing electronic and electrical device part scraps, and a method for processing electronic and electrical device part scraps using those devices. An apparatus for analyzing a composition of electronic and electrical device part scraps including a classification data storage means for storing a classification data for extracting images of a plurality of component types of electronic and electrical device part scraps from a captured image of electronic and electrical device part scraps composed of the plurality of component types and classifying extracted images into each of the plurality of component types, a classification means for classifying the extracted images into each of the plurality of component types extracted from the captured image of the electronic and electrical device part scraps according to the classification data, and analysis means for analyzing at least one of an area, a number, an average particle size, and weight ratio of each of the plurality of component types classified by the classification means.

10 Claims, 5 Drawing Sheets

(58) Field of Classification Search
CPC ......... G06T 2207/30148; G06T 7/0004; G06T 7/60; B07C 2501/0054; B07C 5/342; B07C 5/34; B07C 5/04; B07C 5/16; Y02P 10/20; Y02W 30/82; G06F 18/24
See application file for complete search history.

(56) References Cited

FOREIGN PATENT DOCUMENTS

| | | | |
|---|---|---|---|
| JP | 2001-229385 A | | 8/2001 |
| JP | 3681316 B2 | * | 8/2005 |
| JP | 2012-115785 A | | 6/2012 |
| JP | 2015-123418 A | | 7/2015 |
| JP | 2016-218979 A | | 12/2016 |
| JP | 2018-118223 A | | 8/2018 |
| WO | WO 2015/098232 | * | 7/2015 |
| WO | WO 2019177176 A1 | * | 9/2019 |

OTHER PUBLICATIONS

International Preliminary Report on Patentability and English translation of the Written Opinion of the International Searching Authority (forms PCT/IB/373, PCT/ISA/237 and PCT/IB/338), dated May 14, 2021, for corresponding International Application No. PCT/JP2019/042696.

* cited by examiner

|  | AREA (cm²) | NUMBER (PIECE) | AVERAGE PARTICLE SIZE (μm) | WEIGHT RATIO (%) |
|---|---|---|---|---|
| SUBSTRATES | 120 | 100 | 1.6 | 70 |
| PLASTICS | 50 | 30 | 1.9 | 22 |
| METAL PIECES | 10 | 5 | 2.1 | 3 |
| COPPER WIRE SCRAPS | 20 | 45 | 1 | 6 |
| TOTAL | 200 | 180 | 1.6 | 100 |

APPARATUS FOR ANALYZING COMPOSITION OF ELECTRONIC AND ELECTRICAL DEVICE PART SCRAPS, DEVICE FOR PROCESSING ELECTRONIC AND ELECTRICAL DEVICE PART SCRAPS, AND METHOD FOR PROCESSING ELECTRONIC AND ELECTRICAL DEVICE PART SCRAPS

FIELD OF THE INVENTION

The present invention relates to an apparatus for analyzing a composition of electronic and electrical device part scraps, a device for processing electronic and electrical device part scraps, and a method for processing electronic and electrical device part scraps.

BACKGROUND OF THE INVENTION

From the viewpoint of recent resource conservation, recovery of variable metals from electronic and electrical device part scraps such as waste electronic home appliances, PCs and mobile phones has increasingly become popular, and an efficient method for recovering the valuable metals has been studied and proposed.

For example, Japanese Patent Application Publication No. H09-78151 A (Patent Literature 1) discloses a recycling method for valuable metals, including the steps of charging scrap containing valuable metals into a flash furnace for smelting copper ores, and recovering the valuable metals into a mat that is retained in the furnace. According to such a recycling method, scrap processing can be combined with copper smelting in the copper smelting flash furnace, so that the valuable metals can be recovered at low cost even from scrap having a lower content of the valuable metals.

However, in the processing using the copper smelting flash furnace as disclosed in Patent Literature 1, an increased amount of the electronic and electrical device part scrap processed may lead to an increase in a carbon component contained in organic substances such as resins forming the electronic and electrical device part scrap, which may cause troubles due to over-reduction in the smelting furnace. On the other hand, since the amount of the electronic and electrical device part scrap processed tends to be increased in recent years, there is a need for efficient processing in the copper smelting flash furnace.

As one of methods for suppressing the generation of troubles due to over-reduction in the copper smelting flash furnace, it is proposed that the electronic and electrical device part scrap is crushed before processing of the electronic and electrical device part scrap in a copper smelting flash furnace to reduce the volume. For example, Japanese Patent Application Publication No. 2015-123418 A (Patent Literature 2) discloses that electrical and electronic device component scraps containing copper is incinerated and then crushed to have a predetermined size or less, and the crushed electrical and electronic device component scrap is processed in a copper smelting furnace.

However, the increased amount of electronic and electrical device part scrap processed leads to introduction of a larger amount of unwanted substances (smelting inhibitors) for processing in the subsequent copper smelting step than that of the prior arts, depending on types of substances contained in the electronic and electrical device part scrap. An increased amount of such smelting inhibitors introduced into the copper smelting step arises a situation where an amount of the electronic and electrical device part scrap to be introduced has to be limited.

Conventionally, many efforts have been made for thermodynamic methods in a smelting step and purifying methods for electrolytic solutions in an electrolytic step of copper smelting, including the smelting inhibitors derived from natural ores. However, there are many problems in the method for processing the electronic and electrical device part scrap having very high contents of the smelting inhibitors than the natural ores.

In order to obtain processing raw materials for efficiently charging into the smelting process while reducing smelting inhibitors from the electronic and electrical device part scraps, it is desirable from the viewpoint of efficiency to perform mechanical processing using a variety of sorting machines. However, the electronic and electrical device part scraps may include various shapes and types of part scraps, and a raw material composition is often changed due to differences of supply sources or the like. Therefore, in order to perform more appropriate sorting, the raw material composition of the electronic and electrical device part scrap has been evaluated by hand sorting, and the result is reflected in an operation management of the sorting process and in a settings of the operating conditions.

However, in a method of the hand sorting, it takes time to grasp the raw material composition. Therefore, it is difficult to immediately reflect the result in the operation and therefore rapid processing cannot be achieved. It will be useful to sort a large amount of the electronic and electrical device part scraps under more appropriate conditions if the compositions of particular part scraps in the composition of the electronic and electrical device part scrap whose composition changes from moment to moment can be instantly determined.

CITATION LIST

Patent Literatures

[Patent Literature 1] Japanese Patent Application Publication No. H09-78151 A

[Patent Literature 1] Japanese Patent Application Publication No. 2015-123418 A

SUMMARY OF THE INVENTION

Technical Problem

The present disclosure provides an apparatus for analyzing composition of electronic and electrical device part scraps which can determine a composition of part scraps in the electronic and electrical device part scraps in a short time, a device for processing electronic and electrical device part scraps, and a method for processing electronic and electrical device part scraps using those devices.

Solution to Problem

In an aspect, an apparatus for analyzing a composition of electronic and electrical device part scraps according to the present embodiment includes: a classification data storage means for storing a classification data for extracting images of a plurality of component types of electronic and electrical device part scraps from a captured image of electronic and electrical device part scraps composed of the plurality of component types and classifying extracted images into each of the plurality of component types; a classification means for classifying the extracted images into each of the plurality of component types extracted from the captured image of the electronic and electrical device part scraps based on the classification data; and an analysis means for analyzing at least one of an area, a number, an average particle size, and a weight ratio of each of the plurality of component types classified by the classification means.

In another aspect, a device for processing electronic and electrical device part scraps according to the present embodiment includes: an imaging device which captures an image of electronic and electrical device part scraps composed of a plurality of component types; a composition analysis device, including: a classification data storage means for storing a classification data for extracting images of the plurality of component types from a captured image of the electronic and electrical device part scraps and classifying extracted images into each of the plurality of component types; a classification means for classifying the extracted images into each of the plurality of component types extracted from the captured image of the electronic and electrical device part scraps based on the classification data; and an analysis means for analyzing at least one of an area, a number, an average particle size, and a weight ratio of each of the plurality of component types classified by the classification means; and a sorting machine which sorts specific part scraps from the electronic and electrical device part scraps based on an analysis result analyzed by the composition analysis device.

Still in another aspect, a method for processing electronic and electrical device part scraps according to the present embodiment includes: capturing an image of electronic and electrical device part scraps composed of a plurality of component types; classification process for extracting and classifying a captured image of the plurality of component types based on the classification data stored in a classification data storage means for extracting images of the plurality of component types from the captured image of the electronic and electrical device part scraps and classifying extracted images into each of the plurality of component types; and analyzing process for analyzing at least one of an area, a number, an average particle size, and a weight ratio of each of the plurality of component types classified by the classification process.

Advantageous Effects of Invention

According to the present disclosure, it is possible to provide an apparatus for analyzing composition of electronic and electrical device part scraps which can determine a composition of part scraps in the electronic and electrical device part scraps in a short time, a device for processing electronic and electrical device part scraps, and a method for processing electronic and electrical device part scraps using those devices.

DETAILED DESCRIPTION OF THE INVENTION

Figure 1:
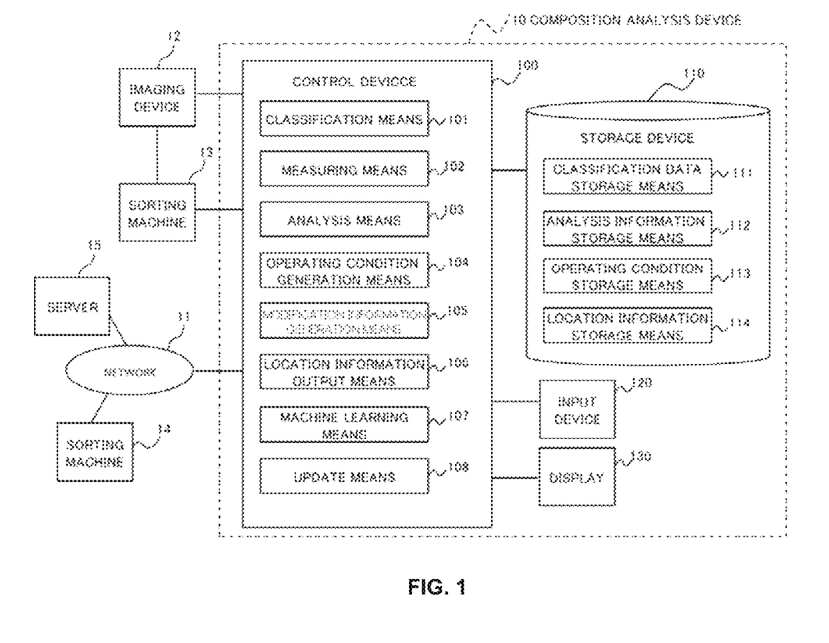
FIG. 1 is: a block diagram illustrating a device for processing electronic and electrical device part scraps according to an embodiment of the present invention.

As shown in FIG. 1, a device for processing electronic and electrical device part scraps according to an embodiment of the present invention includes an imaging device 12 which captures an image of electronic and electrical device part scraps, and a composition analysis device 10 which includes analysis means configured to estimate composition of the electrical device part scraps. The device may further include a sorting machine 13 which sorts specific part scraps from the electrical device part scraps according to a composition analysis result analyzed by the composition analysis device 10.

As used herein, the "electronic and electrical device part scraps" in the present embodiment refers to scraps obtained by crushing electronic and electrical devices such as waste home electric appliances, PCs, and mobile phones, recovering them and then crushing them to have an appropriate size. In the present embodiment, the crushing for obtaining the electronic and electrical device part scraps may be performed by an operator. Crushed objects may be also purchased on the market.

A crushing method may be carried out by any apparatus that is not limited to a specific apparatus, and may be carried out in sharing or shock manner. It is desirable to carry out crushing such that the shapes of the parts are maintained as much as possible. Therefore, the apparatus does not include one belonging to the category of a crusher for the purpose of grinding.

The electronic and electrical device part scraps can be classified into a plurality of component types such as substrates, synthetic resins (plastics) used for housing and the like, metal pieces, copper wire scraps, capacitors, IC chips, and other components, and these component types can be further classified into subclasses depending on purposes of processing. In the present embodiment, the electronic and electrical device part scraps that have been crushed to have a granularity of 50 mm or less may preferably be processed, although not limited thereto.

By analyzing the composition of a plurality of component types included in the electronic and electrical device part scraps, controlling a selection of a sorting machine, and controlling a condition of the sorting machine according to an analyzed result, when sorted materials are used in a copper smelting step, raw materials that have concentrated valuable metals including gold, silver, platinum, palladium, and copper can be obtained while reducing unwanted substances for the processing in the copper smelting step, for example, smelting inhibiting substances such as elements such as antimony (Sb) and nickel (Ni), resins, aluminum (Al), and iron (Fe) as much as possible.

In particular, since the composition analysis device 10 illustrated in FIG. 1 is used to determine a composition of the electronic and electrical device part scraps, and a number, a particle size, a weight ratio, an area, etc. of each part scrap are quantified and evaluated. Therefore, when the sorted materials are used in a copper smelting step, raw materials that have concentrated valuable metals including gold, silver, platinum, palladium, and copper can be obtained while reducing unwanted substances for the processing in the copper smelting step, for example, smelting inhibiting substances such as elements such as antimony (Sb) and nickel (Ni), resins, aluminum (Al), and iron (Fe) as much as possible.

The composition analysis device 10 may include a control unit (control device) 100 for controlling a composition analysis process, a storage device 110 for storing information necessary for various controls, an input device 120, and a display device 130. The control unit 100 may include a classification means 101, a measuring means 102, an analysis means 103, an operating condition generation means 104, a modification information generation means 105, a location information output means 106, a machine learning means 107, and an update means 108. The storage device 110 may include a classification data storage means 111, an analysis information storage means 112, an operating condition storage means 113, and a location information storage means 114. The analysis means 103 can output the analysis result of the analysis means 103 through a network 11 to a sorting machine 14 that is different from a sorting machine 13 connected via a server 15 or the network 11.

The classification data storage means 111 stores classification data for extracting images of a plurality of component types of the electronic and electrical device part scraps from images obtained by capturing an image of the electronic and electrical device part scraps and classifying them into each of the plurality of component types. For example, the classification data storage means 111 includes a basic information for classifying information of an image of the electronic and electrical device part scraps into at least three or more, preferably seven or more of component types, such as substrates, plastics, metal pieces, copper wire scraps, capacitors, IC chips, and others (connectors, film-like part scraps, and coated wire scraps, etc.). Conditions for determining a specific component type in the electronic and electrical device part scraps may be previously determined by an operator to the purpose of the subsequent sorting process.

Figure 2:
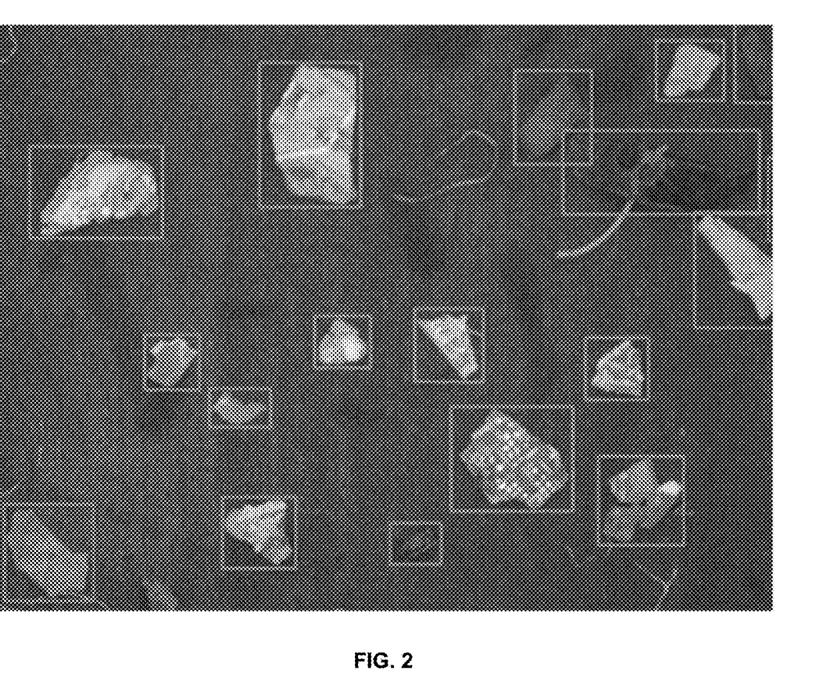
FIG. 2 is a photograph showing an image in which electronic and electrical device part scraps existing in an image are specified for each component type and classified by color frames of different colors for each component type.

The classification means 101 classifies the image of the electronic and electrical device part scraps into each of the plurality of component types according to the classification data stored in the classification data storage means 111. FIG. 2 shows an example of an image in which the classification means 101 classifies each of the component types of the electronic and electrical device part scraps existing in the image, and sorts the classified component types with different color frames for each type.

The measuring means 102 measures an area of the image of each of the component types classified by the classification means. As shown in FIG. 2, the measuring means 102 measures the area of each component type classified by the color frame for each component type by using measurement information stored in the analysis information storage means 112. In the analysis information storage means 112, information necessary for a composition analysis performed by the control unit 100 is stored. For example, information for measuring areas of the component types, information of weight per unit area of each of the component types necessary for calculation of a weight ratio of the part scraps may be stored therein.

The analysis means 103 analyzes a weight ratio of the component types by multiplying an assumed weight per unit area of the plurality of component types by the area of the plurality of component types to estimate the composition of the electronic and electrical device part scraps. The assumed weight per unit area of the plurality of component types can be set in advance by the operator via the input device 120 or the like according to operation results. For example, in a case that the electronic and electrical device part scraps are classified into three component types, the assumed weight per unit area of the substrates may be, for example, 2.0 g/cm$^2$, the assumed weight per unit area of the plastics may be, for example, 1.5 g/cm$^2$, and the assumed weight per unit area of the other parts may be, for example, 1.0 g/cm$^2$, although not limited thereto.

Figure 3:
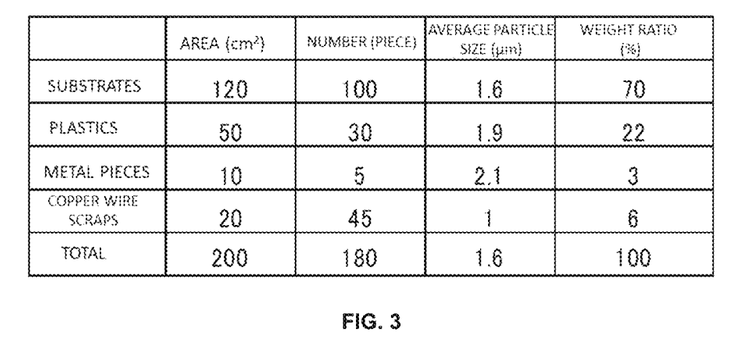
FIG. 3 is a table showing an example of analysis results using a device for processing electronic and electrical device part scraps according to an embodiment of the present invention.

In addition to the analysis of the area, the analysis means 103 can also analyze a number (pieces) of part scraps included in a component type, an average particle size, a weight ratio, and the like calculated by the calculation result of the area and the number as mentioned above, and output them to the display device 130 or the like. An example of the analysis results is shown in FIG. 3. The analysis results illustrated in FIG. 3, it can be seen that the substrates occupy 70% of the total, and then the plastics occupy 22%, the copper wire scraps occupy 6%, and the metal pieces occupy 3%.

The operating condition generating means 104 generates information of an operating condition of the sorting machine for sorting a plurality of the component types based on the analysis result of the weight ratio of the plurality of the component types by the analysis means. As the sorting machine, there are various sorting machines such as a picking machine, a color sorter, a metal sorter, an eddy current sorter, a wind power sorter, a sieving machine, and the like. For example, from the analysis result as shown in FIG. 3, the operating condition generating means 104 generates, for example, an operating condition of the color sorter that sorts the substrates and the plastics, and stores the generated operating condition into the operating condition storage means 113. The operating conditions stored in the operating condition storage means 113 can be output to the sorting machine 13, 14, and the sorting machine 13, 14 can perform the sorting process according to the output operating conditions.

The location information output means 106 acquires location information of each of the plurality of component types classified by the classification means 101 in the image obtained by capturing the image of the electronic and electrical device part scraps, and stores the location information in the location information storage means 114. Then, the location information is output to the specific sorting machine 13, 14 for extracting a position of a specific component type from the plurality of component types. For example, the substrates and the metal pieces cannot be sorted by the specific sorting machine 13, 14 such as a metal sorter, however if the location information can be obtained individually from the image information, they can be sorted by the sorting machine 13, 14 which has a function of picking.

The machine learning means 107 processes the classification data which the classification means 101 refers to by employing machine learning according to the plurality of the captured images of the electronic and electrical device part scraps or sorting results of the sorting machine 13, 14.

In machine learning, at first, a tag is attached to a single component type of the electronic and electrical device part scraps appeared in a captured image of the electronic and electrical device part scraps. For example, when the substrates shown in the image is tagged with a paint software by surrounding it with a red line, and the machine learning means 107 learns that the tagged component type is a substrate. Similarly, the machine learning means 107 learns that each of the plastics, metal pieces, copper wire scraps, etc. surrounded by several kinds of colors is a unique component type. In such a way, 100 or more pieces, preferably hundreds to thousands of pieces of training data are prepared, and these learning data are processed by the machine leaning means 107 to learn the characteristics of each component type so as to improve the accuracy of the classification.

The updating means 108 updates the classification data used by the classification means 101 to classify the component types based on the learning result of the machine learning means 107. The updated classification data may be output to the sorting machine 14 or the server 15 connected via the network 11.

Figure 4:
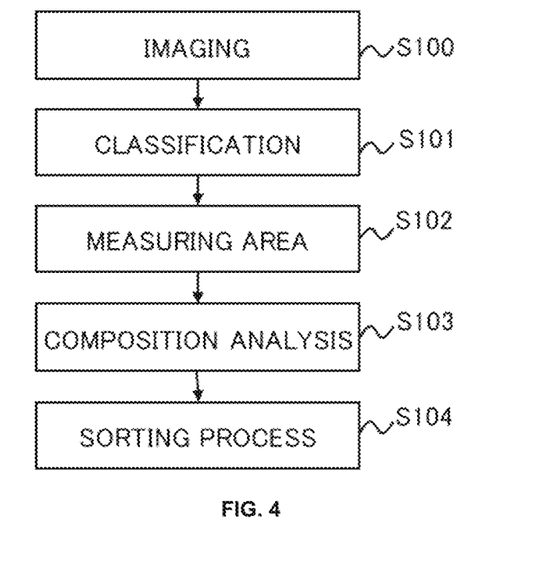
FIG. 4 is a flowchart showing an example of a method for processing the electronic and electrical device part scraps according to an embodiment of the present invention.

An example of a method for processing the electronic and electrical device part scraps using the electronic and electrical device part scraps processing apparatus as shown in FIG. 1 will be described with reference to the flowchart of FIG. 4. In a step S100, the electronic and electrical device part scraps conveyed to the conveying means (conveyor) of the sorting machine 13 of FIG. 1 are imaged using the imaging device 12. In a step S101, the classification means 101 of FIG. 1 classifies part scraps existing in the image captured by the imaging device 12 for each component type (for example, seven categories of substrates, plastics, metal pieces, copper wire scraps, capacitors, IC chips, and other component types) based on the classification data stored in the classification data storage means 111.

The classification result classified by the classification means 101 may be displayed by the display device 130 or the like. The classification results are framed with different colors for each part type in order to make it easier for the operator to recognize the result. For example, the substrates are displayed in red frame and the plastics are displayed in blue frame in an image displayed on the display device. At this time, the location information output means of FIG. 1 can store the location information based on the classification result by the classification means 101 in the location information storage means 114.

For example, when the classification of seven categories of substrates, plastics, metal pieces, copper wire scraps, capacitors, IC chips, and other parts are performed, by optimizing the sorting conditions so that the substrates, the copper wire scraps, the capacitors, and the IC chips are regarded as valuable resources, and the metal pieces (aluminum, etc.) and the plastics are regarded as smelting inhibitors and sorted, it is possible to quantify and manage a separation efficiency, loss rate, and operation results of the electronic and electrical device part scraps.

In a step S102, the measuring means 102 measures areas of the plurality of component types classified by the sorting means 101. The area of the component type measured by the measuring means 102 can be performed by using a known area detection software for estimating the area from the image. In a step S103, the analysis means 103 estimates the composition of the electronic and electrical device part scraps by analyzing a weight ratio of the component types by multiplying an assumed weight per unit area of the component types by the area of the component types.

For example, as shown in FIG. 3, the analysis means 103 can quantify and analyze an average area, a number, an average particle size, a weight ratio, etc. of each of a plurality of component types from the images captured by the image pickup apparatus 12. Therefore, it is possible to quantify and grasp the composition of the raw material remarkably and more quickly than the conventional method of manually evaluating the raw material composition of the electronic and electrical device part scraps by hand sorting.

In a step S104, the sorting process is performed based on the raw material analysis result analyzed by the analysis means 103. For example, based on the composition analysis result obtained in the step S103, the selection of the sorting machine for sorting the raw materials and the operating conditions such as a sorting condition and a sorting order are determined, and the sorting process is performed based on the operating conditions.

For example, a process for increase the weight ratio of substrates and plastics in the processed material after sorting can be done by performing a wind power sorting using a wind power sorter for the electronic and electrical device part scraps to sort them into lightweight goods and heavy goods. In this case, in the processing by the sorting machines 13 and 14, the air volume of the wind power sorter can be adjusted according to the average particle size of a plurality of component types based on the raw material analysis result analyzed by the analysis means 103. The air volume can be, for example, 5 to 20 m/s, more preferably 5 to 12 m/s, and further 5 to 10 m/s. The wind power sorting can be repeated twice or more depending on the raw material analysis result analyzed by the analysis means 103.

Alternatively, a picking process for removing massive copper wire scrap can be performed by performing a picking process using a picking device before carrying out the above-mentioned wind power sorting. In this picking process, the location information of the copper wire scraps stored in the location information storage means 114 is output to the picking device as the sorting machine 13, and the picking device can remove the copper wire scraps according to the output result. This copper wire scraps can be sent to, for example, a valuable metal recovery process.

When the wind power sorting is repeated two or more times, a sorting process using a sieving machine can be performed between the first wind power sorting and the second wind power sorting. In this case, a sieving machine is adopted as the sorting machine 13, and the size of the sieve mesh can be changed to sort a particular component type based on the average particle size of the component type.

In addition to the methods described above, since it is possible to utilize the composition analysis result analyzed by the composition analysis device according to the present embodiment for the sorting machine 13 which is also used in the magnetic force sorting step the eddy current sorting step, and the optical sorting step of optically sorting metal objects and non-metallic objects, the image data can be analyzed in real time while continuously photographing the electronic and electrical device part scraps and the raw material composition can be analyzed.

Conventionally, the raw material composition of the electronic and electrical device part scraps is evaluated by hand sorting, and the result is reflected in the operation management of the sorting process and the setting of operating conditions. However, the manually sorting the raw material composition was not possible to perform rapid processing with the method of grasping the composition of the raw materials.

According to an embodiment of the present invention, the composition of the electronic and electrical device part scraps whose composition changes from moment to moment can be instantly discriminated and quantified by image analysis and separation based on predetermined classification data. Therefore, a large amount of the electronic and electrical device part scraps can be quickly sorted under more appropriate conditions.

Further, by image-analyzing the raw material composition of the parts scraps before and after the treatment by the sorting machines 13 and 14, the sorting efficiency (results) of the parts scraps can be evaluated based on the amount of change in the parts scraps. Individual parts can be easily separated by interlocking with the sorting machines 13 and 14 including a picking device, a color sorter, and a metal sorter.

Further, since the display device 130 displays the analysis result with a frame having a different color for each raw material type, the operator can easily recognize it, so that the false detection of the composition analysis device can be easily recognized.

As described above, the present disclosure is not limited to the present embodiments, and the components may be modified and embodied without departing from the spirit of the present invention. Further, various inventions may be formed by appropriately combining a plurality of components disclosed in the present embodiments. For example, some components may be deleted from all the components shown in the present embodiments, or the respective components may be combined as appropriate.

For example, the composition analysis for adjusting the raw materials to be charged into copper smelting can be performed by using the composition analysis apparatus according to the embodiment of the present invention. Currently, the weight of plastic in the electronic and electrical device part scraps charged into a copper smelting furnace (flash smelting furnace) is unknown and may be changed depending on the raw materials. If the weight of plastic in the raw material is excessive, it may cause an overreduction state and it may affect the operation. The weight ratio of the plastic contained in the electronic and electrical device part scraps can be analyzed by using the composition analysis apparatus according to the embodiment of the present invention with respect to the raw material charged into the copper smelting process. By blending copper ore with the raw material according to the weight ratio of the plastic in the analyzed raw material to adjust the ratio of the plastic, the operation of copper smelting can be stabilized for a long period of time.

Figure 5A:
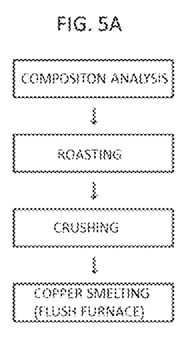
FIG. 5 is a flowchart showing an application example of the method for processing the electronic and electrical device part scraps according to an embodiment of the present invention.
Figure 5B:
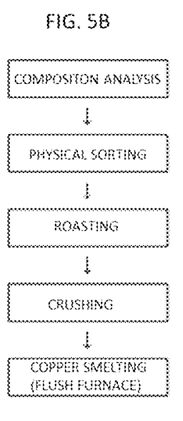
Figure 5C:
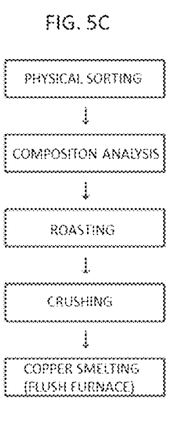
Figure 5D:
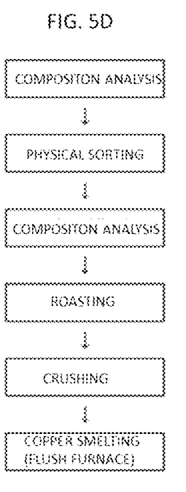

As a processing flow for adjusting the raw material in the copper smelting process, as shown in FIG. 5A, it is possible to adjust the composition of the raw material for charging into the copper smelting furnace after the composition analysis is carried out according to the embodiment of the present invention, and then the adjusted raw material is roasted and crushed. Alternatively, as shown in FIG. 5B, after performing the composition analysis according to the embodiment of the present invention, a physical sorting process using the above-mentioned various sorting machines 13, 14 and the like based on the composition analysis result is conducted to decrease the weight ratio of plastic. After decreasing the weight ratio of the plastic, it is possible to perform roast and crush treatments and then charge the raw material after the crushing treatment into the copper smelting furnace. Alternatively, as shown in FIG. 5C, the raw materials for which a predetermined physical sorting is performed are subjected to composition analysis according to the embodiment of the present invention to confirm the composition of the raw materials, and then roasted and crushed. After the treatment, the raw material after the crushing treatment can be charged into the copper smelting furnace. Alternatively, as shown in FIG. 5D, the composition analysis according to the embodiment of the present invention is performed before and after the physical sorting, and then roasting and crushing are performed, and the raw material after the crushing is sent to a copper smelting furnace.

DESCRIPTION OF REFERENCE NUMERALS

10 . . . composition analysis device
11 . . . Network
12 . . . Imaging device
13,14 . . . Sorting machine
15 . . . Server
100 . . . Control unit
101 . . . Classification means
102 . . . Measuring means
103 . . . Analysis means
104 . . . Operating condition generation means
105 . . . Modification information generation means
106 . . . Location information output means
107 . . . Machine learning means
108 . . . Update means
110 . . . Storage device
111 . . . Classification data storage means
112 . . . Analysis information storage means
113 . . . Operating condition storage means
114 . . . Location information storage means
120 . . . Input device
130 . . . Display device

The invention claimed is:

1. An apparatus for analyzing a composition of electronic and electrical device part scraps comprising:
a classification data storage for storing a classification data for extracting images of a plurality of component types of electronic and electrical device part scraps from a captured image of electronic and electrical device part scraps composed of the plurality of component types and classifying extracted images into each of the plurality of component types; and
a controller configured to:
classify the extracted images into each of the plurality of component types extracted from the captured image of the electronic and electrical device part scraps based on the classification data;
measure an area of the component types that are classified;
analyze a weight ratio of the component types by multiplying an assumed weight per unit area of the component types by the area of the component types; and
analyze the measured area, a number, an average particle size, and the weight ratio of each of the plurality of component types that are classified.

2. The apparatus for analyzing composition of electronic and electrical device part scraps according to claim 1, wherein the controller classifies the electronic and electrical device part scraps into at least three types of substrates, plastics.

3. The apparatus for analyzing composition of electronic and electrical device part scraps according to claim 1, wherein the controller classifies the electronic and electrical device part scraps into at least seven types of substrates, plastics, metal pieces, copper wire scraps, capacitors, IC chips.

4. The apparatus for analyzing composition of electronic and electrical device part scraps according to claim 1, wherein the controller generates information of operating conditions of a sorting machine which sorts the plurality of component types based on an analysis result of the weight ratio of the plurality of component types that are analyzed.

5. The apparatus for analyzing composition of electronic and electrical device part scraps according to claim 1, wherein the controller generates information for modifying air volume of a wind power sorter or a mesh size of a sieving machine according to an average particle size of the plurality of component types by analyzing the average particle size from the area and the number of the plurality of component types.

6. The apparatus for analyzing composition of electronic and electrical device part scraps according to claim 1, wherein the controller acquires location information of each of the plurality of component types that are classified from the captured image of the electronic and electrical device part scraps, extracts a location of a specific component type from the plurality of component types, and outputs the location information of the specific component type to a sorting machine for sorting the specific component type.

7. The apparatus for analyzing composition of electronic and electrical device part scraps according to claim 1, wherein the controller updates the classification data including new training data in which a tag is attached to the captured image of the electronic and electrical device part scraps to identify the component types of the electronic and electrical device part scraps based on a learning result processed by machine learning which processes the classification data referred for a purpose of classification based on a plurality of captured images of the electronic and electrical device part scraps or a sorting result of a sorting machine for sorting the plurality of the component types.

8. A device for processing electronic and electrical device part scraps comprising:
An imaging device which captures an image of electronic and electrical device part scraps composed of a plurality of component types;
A composition analysis device, comprising:
A classification data storage for storing a classification data for extracting images of the plurality of component types from a captured image of the electronic and electrical device part scraps and classifying extracted images into each of the plurality of component types; and
a controller configured to:
classify the extracted images into each of the plurality of component types extracted from the captured image of the electronic and electrical device part scraps based on the classification data;
measure an area of the component types that are classified;
analyze at least a weight ratio of the component types by multiplying an assumed weight per unit area of the component types by the area of the component types; and
analyze at least the measured area, a number, an average particle size, and the weight ratio of each of the plurality of component types that are classified; and a sorting machine which sorts specific part scraps from the electronic and electrical device part scraps based on an analysis result analyzed by the composition analysis device.

9. A method for processing electronic and electrical device part scraps comprising:
capturing an image of electronic and electrical device part scraps composed of a plurality of component types;
extracting images of a plurality of component types of electronic and electrical device part scraps from the captured image of electronic and electrical device part scraps composed of the plurality of component types,
classifying the extracted images of the plurality of component types into each of the plurality of component types extracted from the captured image of the electronic and electrical device part scraps based on a classification data stored in a classification data storage, the classification data being stored for the extracting images of the plurality of component types of electronic and electrical device part scraps from the captured image;
measuring an area of the component types that are classified;
analyzing at least a weight ratio of the component types by multiplying an assumed weight per unit area of the component types by the area of the component types; and
analyzing the measured area, a number, an average particle size, and the weight ratio of each of the plurality of component types classified by the classification process.

10. The method for processing electronic and electrical device part scraps according to claim 9, wherein the analyzing process comprises analyzing a weight ratio of the plastics included in the electronic and electrical device part scraps,
and the method further comprises:
adjusting a raw material including the electronic and electrical device part scraps to be charged in a copper smelter furnace based on an analysis result of the weight ratio of the plastics; and
conducting copper smelting the raw material after adjusting process.

* * * * *